United States Patent
Harper et al.

(10) Patent No.: US 9,392,521 B2
(45) Date of Patent: Jul. 12, 2016

(54) SYSTEM AND METHOD FOR CONCURRENTLY DETERMINING LOCATIONS OF MOBILE DEVICE IN WIRELESS COMMUNICATION NETWORK

(75) Inventors: Neil Harper, Mangerton (AU); Martin Dawson, Wollongong (AU)

(73) Assignee: Telecommunication Systems, Inc., Annapolis, MD (US)

( * ) Notice: Subject to any disclaimer, the term of this patent is extended or adjusted under 35 U.S.C. 154(b) by 1156 days.

(21) Appl. No.: 12/406,378

(22) Filed: Mar. 18, 2009

(65) Prior Publication Data
US 2010/0238070 A1 Sep. 23, 2010

(51) Int. Cl.
*G01S 19/09* (2010.01)
*H04W 36/38* (2009.01)
*G01S 19/48* (2010.01)

(52) U.S. Cl.
CPC .................. *H04W 36/385* (2013.01)

(58) Field of Classification Search
CPC .................................................. H04W 36/385
USPC ............................ 342/357.06, 357.46, 357.31
See application file for complete search history.

(56) References Cited

U.S. PATENT DOCUMENTS

| | | | | |
|---|---|---|---|---|
| 5,999,124 | A * | 12/1999 | Sheynblat | 342/357.29 |
| 6,081,229 | A * | 6/2000 | Soliman et al. | 342/357.42 |
| 6,097,709 | A | 8/2000 | Kuwabara | |
| 6,108,558 | A | 8/2000 | Vanderspool, II | |
| 6,115,605 | A | 9/2000 | Siccardo et al. | |
| 6,249,252 | B1 * | 6/2001 | Dupray | 342/450 |
| 6,269,246 | B1 | 7/2001 | Rao et al. | |
| 6,281,834 | B1 | 8/2001 | Stilp | |
| 6,393,294 | B1 | 5/2002 | Perez-Breva et al. | |
| 6,449,486 | B1 | 9/2002 | Rao | |
| 6,556,832 | B1 * | 4/2003 | Soliman | 455/456.5 |
| 6,591,112 | B1 | 7/2003 | Siccardo et al. | |

(Continued)

FOREIGN PATENT DOCUMENTS

EP 1 986 017 A2 10/2008
WO 2008/036676 A2 3/2008

OTHER PUBLICATIONS

Related to co-pending U.S. Appl. No. 12/406,384.

(Continued)

*Primary Examiner* — Frank J McGue
(74) *Attorney, Agent, or Firm* — Tarolli, Sundheim, Covell & Tummino LLP (57) ABSTRACT

A method for a mobile location center (MLC) to determine a location of a mobile device in a wireless communication network includes receiving a request to determine the location of the mobile device; concurrently requesting global navigation satellite system (GNSS) measurements from the mobile device and terrestrial measurements from transceivers in the wireless communication network, and receiving the GNSS measurements and at least one of the terrestrial measurements. A GNSS location of the mobile device is calculated as a function of the GNSS measurements, and the calculated GNSS location is determined to be the location of the mobile device when the calculated GNSS location meets a predetermined accuracy threshold. A terrestrial location of the mobile device is calculated as a function of the terrestrial measurements, and the calculated terrestrial location is determined to be the location of the mobile device when the calculated terrestrial location meets the predetermined accuracy threshold.

19 Claims, 5 Drawing Sheets

(56) References Cited

U.S. PATENT DOCUMENTS

| | | | |
|---|---|---|---|
| 6,782,265 B2 | 8/2004 | Perez-Breva et al. | |
| 6,944,465 B2 | 9/2005 | Spain et al. | |
| 7,084,809 B2 * | 8/2006 | Hockley et al. | 342/357.48 |
| 7,116,987 B2 | 10/2006 | Spain, Jr. et al. | |
| 7,167,714 B2 | 1/2007 | Dressler et al. | |
| 7,209,077 B2 | 4/2007 | Harper | |
| 7,233,799 B2 | 6/2007 | Spain, Jr. | |
| 7,250,907 B2 | 7/2007 | Krumm et al. | |
| 7,257,412 B2 | 8/2007 | Chen et al. | |
| 7,257,414 B2 | 8/2007 | Spain, Jr. et al. | |
| 7,383,051 B2 | 6/2008 | Spain, Jr. et al. | |
| 7,433,652 B2 | 10/2008 | Durgin | |
| 7,433,695 B2 | 10/2008 | Gordon et al. | |
| 7,460,505 B2 | 12/2008 | Spain | |
| 7,499,712 B2 * | 3/2009 | Riley et al. | 455/456.1 |
| 7,636,566 B2 * | 12/2009 | Karabinis | 455/427 |
| 7,659,850 B1 | 2/2010 | Hou et al. | |
| 7,725,111 B2 | 5/2010 | Dressler et al. | |
| 7,734,298 B2 | 6/2010 | Bhattacharya et al. | |
| 7,753,278 B2 | 7/2010 | Spain, Jr. et al. | |
| 7,796,966 B2 | 9/2010 | Bhattacharya et al. | |
| 7,848,762 B2 | 12/2010 | Gordon et al. | |
| 7,899,467 B2 | 3/2011 | Feuerstein et al. | |
| 8,013,785 B2 | 9/2011 | Bhattacharya et al. | |
| 8,068,802 B2 | 11/2011 | Bhattacharya et al. | |
| 8,068,855 B2 | 11/2011 | Dressler et al. | |
| 8,106,817 B2 | 1/2012 | Bhattacharya et al. | |
| 8,106,818 B2 | 1/2012 | Bhattacharya et al. | |
| 8,155,394 B2 | 4/2012 | Allegra et al. | |
| 2003/0004640 A1 | 1/2003 | Vayanos | |
| 2004/0174297 A1 | 9/2004 | Cho | |
| 2004/0203539 A1 | 10/2004 | Benes et al. | |
| 2005/0136945 A1 | 6/2005 | Kennedy et al. | |
| 2005/0148346 A1 | 7/2005 | Maloney et al. | |
| 2005/0192024 A1 * | 9/2005 | Sheynblat | 455/456.1 |
| 2005/0206566 A1 | 9/2005 | Stilp et al. | |
| 2008/0059059 A1 | 3/2008 | Cohen et al. | |
| 2008/0074317 A1 | 3/2008 | Harper et al. | |
| 2008/0133126 A1 | 6/2008 | Dupray | |
| 2008/0248811 A1 | 10/2008 | Maloney et al. | |
| 2008/0261614 A1 | 10/2008 | Mia et al. | |

OTHER PUBLICATIONS

Rick Roberts, "Project: IEEE P802.15 Working Group for Wireless Personal Area Networks (WPANS)," Harris Corporation, Melbourne Florida, Oct. 4, 2004, pp. 1-11.

Stephanie Bell, A Beginners Guide to Uncertainty of Measurement, The National Physics Laboratory of the United Kingdom of Great Britain and Northern Ireland, Teddington, Middlesex, UK, 2001, pp. 1-41.

* cited by examiner

SYSTEM AND METHOD FOR CONCURRENTLY DETERMINING LOCATIONS OF MOBILE DEVICE IN WIRELESS COMMUNICATION NETWORK

BACKGROUND AND SUMMARY

A wireless communication network typically includes multiple cells having corresponding base stations for exchanging communications with mobile devices operating within the cell. The base stations are connected to a centralized system, such as a mobile location center (MLC), for coordinating the communications and interfacing with other networks, such as the public switched telephone network (PSTN) and/or a packet switching network, such as the Internet.

A variety of modern wireless communication services include the feature of determining a geographic location of a mobile device. For example, an emergency service responsive to "911" being initiated at the mobile device includes estimating latitude and longitude of the mobile device in order to locate the device, which is particularly important when a distressed caller is otherwise unable to provide their present location. The geographic location of the mobile device may be determined by a server or other node in the wireless communication network, such as a Mobile Location Center (MLC). The MLC may determine the geographic location of a mobile device operating within the wireless communication network using positioning measurements from a global navigation satellite system (GNSS) or measurements from a terrestrial positioning system.

Location determinations based on GNSS measurements are generally more accurate than terrestrial measurements, although there are exceptions. For example, GNSS positioning may not be effective in urban environments or indoors, where structures obscure access to multiple satellites, or otherwise weaken signal strengths, or introduce multi-path components to the signals. Therefore, conventional systems for determining geographic locations of mobile devices typically rely on GNSS measurements, and resort to terrestrial measurements only when GNSS measurements are not available or fail to provide reliable results. Conventional systems may also combine GNSS and terrestrial measurements by requesting and using them in a linear fashion. This approach is time-consuming, and does not necessarily result in the most accurate geographic location determination.

In a representative embodiment, a method is provided for an MLC to determine a location of a mobile device in a wireless communication network. The method includes receiving a request initiated by the mobile device to determine the location of the mobile device; concurrently requesting global navigation satellite system (GNSS) measurements from the mobile device and terrestrial measurements from transceivers in the wireless communication network, and receiving the GNSS measurements and at least one of the terrestrial measurements. A GNSS location of the mobile device is calculated as a function of the received GNSS measurements, and the calculated GNSS location is determined to be the location of the mobile device when the calculated GNSS location meets a predetermined accuracy threshold. A terrestrial location of the mobile device is calculated as a function of the received terrestrial measurements, and the calculated terrestrial location is determined to be the location of the mobile device when the calculated terrestrial location meets the predetermined accuracy threshold. A hybrid location of the mobile device is calculated as a function of the received GNSS measurements and the received terrestrial measurements when neither the calculated GNSS location nor the calculated terrestrial location meets the predetermined accuracy threshold. The calculated hybrid location is determined to be the location of the mobile device when the calculated hybrid location meets the predetermined accuracy threshold.

In another representative embodiment, a system is provided for determining a location of a mobile device in a wireless communication network. The system includes an MLC configured to determine a first location of the mobile device and a corresponding first accuracy as a function of first measurements, to determine a second location of the mobile device and a corresponding second accuracy as a function of second measurements, and to identify one of the first location and the second location as the geographic location of the mobile device when any one of the first or second accuracies exceeds a predetermined threshold.

In another representative embodiment, a method is provided for an MLC to determine a geographic location of a mobile device in a wireless communication network. The method includes concurrently requesting global navigation system (GNSS) measurements from the mobile device and terrestrial measurements from nodes in the wireless communication network. A first location of the mobile device is calculated as a function of the GNSS measurements, a second location is calculated as a function of the terrestrial measurements, and a third location is calculated as a function of both the GNSS measurements and the terrestrial measurements. One of the first, second or third locations having a highest accuracy is selected as the geographic location of the mobile device.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

In various embodiments, the geographic location of a mobile device is efficiently determined based on location measurements acquired and processed over the same period of time from multiple positioning systems, such as a global navigation satellite system (GNSS) and a terrestrially-based system, at the same time. For example, in a representative embodiment, separate GNSS and terrestrial measurements are acquired and processed substantially in parallel to calculate locations based on the GNSS and terrestrial measurements, respectively. For example, receiving and processing of the terrestrial measurements begins without having to await completion of the location calculation based on the GNSS measurements. A hybrid geographic location is then calculated as a function of both the GNSS and terrestrial measurements. The most accurate and/or reliable location is then selected as the location of the mobile device. This embodiment thus optimizes use of all available location measurement systems and techniques in an efficient manner.

In another representative embodiment, GNSS and terrestrial measurements are acquired and processed substantially in parallel to begin to calculate locations based on the GNSS and terrestrial measurements, respectively. However, the first respective calculated geographic location meeting predetermined accuracy and/or reliability criteria is selected, regardless of whether the other geographic location calculation(s) has been completed. A hybrid location based on both the GNSS and terrestrial measurements is calculated only when the geographic locations calculated respectively based on the GNSS measurements or the terrestrial measurements do not meet the accuracy criteria. This embodiment thus optimizes timing of determining the geographic location of the mobile device.

Figure 1:
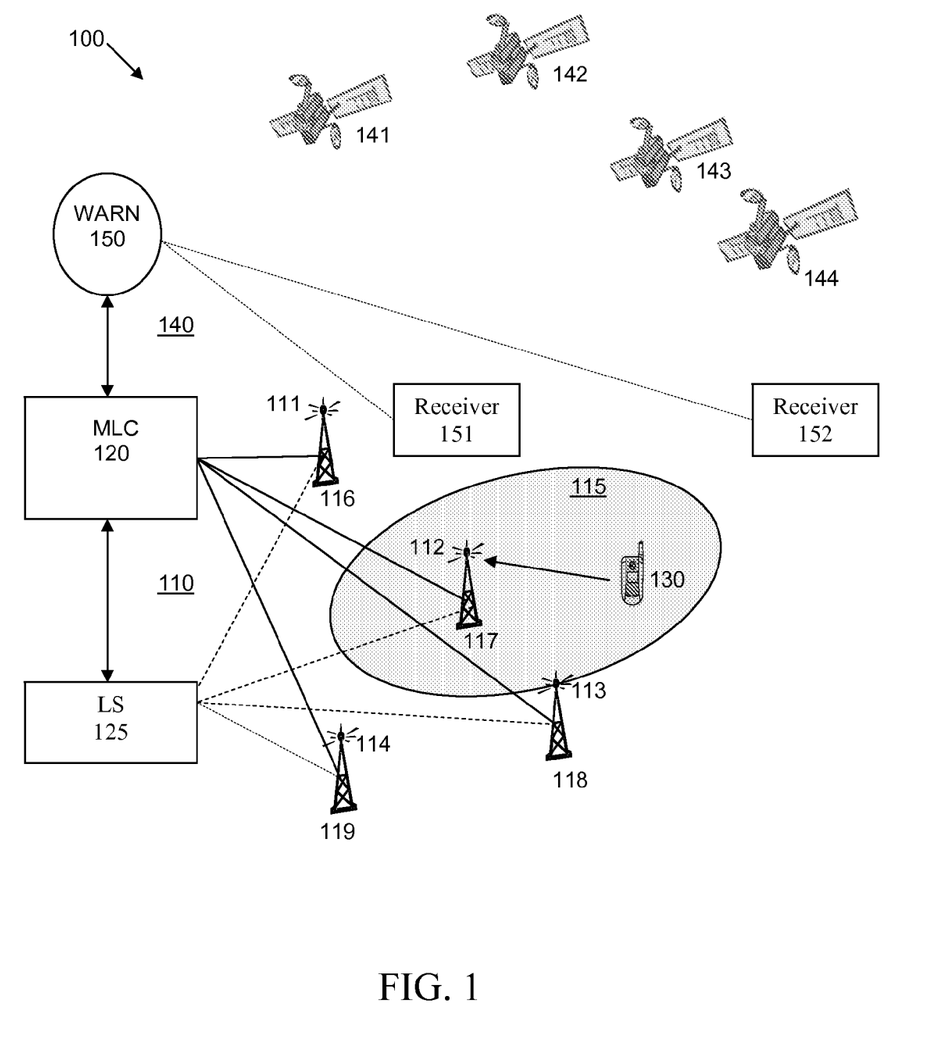
FIG. 1 is a functional block diagram illustrating a system for locating a mobile device in a wireless communication network, according to a representative embodiment.

FIG. 1 is a functional block diagram illustrating a system for locating a mobile device in a wireless communication network, according to a representative embodiment. In particular, the embodiment of FIG. 1 shows system 100, which includes wireless communication network 110 and GNSS network 140.

The wireless communication network 110 includes representative cell towers or base stations 111-114, mobile location center (MLC) 120 and location server (LS) 125. Each base station 111-114 is associated with a corresponding coverage area or "cell," although only cell 115 associated with base station 112 is depicted for purposes of explanation, since FIG. 1 depicts base station 112 as the base station serving representative mobile device 130 at its present location. The mobile device 130 may be any type of wireless device configured for communicating over the wireless communication network 110, including a cellular telephone, a laptop computer, a personal computer, a personal digital assistant (PDA), a gaming device, or the like. The wireless communication network 110 is configured to enable wireless communications between the mobile device 130 and the base stations 111-114 in compliance with various wireless communications standards, including, but not limited to, Universal Mobile Telecommunications System (UMTS) network, Global System for Mobile communications (GSM) network, code division multiple access (CDMA), IEEE 802.11 (WiFi), IEEE 802.16 (WiMax), and the like.

In an embodiment, the MLC 120 and the LS server 125 are configured to determine geographic locations of mobile devices in the wireless communication network 110, including the representative mobile device 130. For example, the MLC 120 may receive a message from the mobile device 130 through the base station 112 requesting determination of the geographic location of the mobile device 130. The message may be transmitted over voice/data communication channels and/or signaling channels of the wireless communication network 110, for example. In response, the MLC 120 forwards a corresponding request to the LS server 125, which retrieves measurements from location measurement units (LMUs) 116-119 of a terrestrial positioning system for determining the geographic location of the mobile device 130. In various embodiments, the terrestrial positioning system may be any system configured to determine the location of a mobile device using terrestrial measurements as input to the position calculation, which may be a trilateration technique. The terrestrial measurements may come be from an uplink-time difference of arrival (U-TDOA) system, an enhanced observed time difference (E-OTD) system, an angle of arrival (AoA) system, power of arrival (POA) system, or the like. When the terrestrial measurement system is a U-TDOA system, the LS server 225 is implemented as a U-TDOA location server (ULS).

The LMUs 116-119 are positioned throughout the wireless communication network 110. In the depicted embodiment, the LMUs 116-119 are transceivers collocated with the base stations 111-114, although it is understood that in alternative embodiments the LMUs 116-119 may be positioned at different locations, and that there may be a different number of LMUs 116-119 than base stations 11'-114. The MLC 120 is then able to calculate the location of the mobile device 130 using at least the terrestrial measurements obtained by the LS server 125, as discussed below. In an embodiment, the functionality of the LS server 125 is implemented by the MLC 120, although the LS server 125 may alternatively be a separate entity connected to the MLC 120 through an interface.

The GNSS network 140 shown in FIG. 1 includes a constellation of positioning satellites 141-144, which provide signals to the mobile device 130. The GNSS network 140 may include any satellite positioning system configured to provide geographic locations of receivers using a constellation of satellites, such as the Global Positioning System (GPS), Global Navigation Satellite System (GLONASS), Galileo and COMPASS Navigation Satellite System (BeiDou), for example. The mobile device 130 includes a corresponding mobile GNSS receiver that receives the satellite positioning signals from the positioning satellites 141-144. The mobile device 130 is thus able to provide GNSS measurements to the MLC 120 over the wireless communications network 110. The MLC 120 is then able to calculate the location of the mobile device 130 using at least the GNSS measurements, as discussed below. In an embodiment, the mobile device 130 calculates its own location based on the GNSS measurements, and sends the calculated GNSS location to the MLC 120. However, the MLC 120 typically has more processing power, and the mobile device 130 saves battery power by not performing the calculations. Also, the MLC 120 is able to perform a hybrid location calculation because it has access to other measurements that the mobile device 130 does not have access to, such as U-TDOA measurements, base station timing or ranging signals, and/or signals from other terrestrial systems.

In an embodiment, the GNSS network 140 also includes a wide area reference network (WARN) 150. The WARN 150 provides a network of fixed GNSS receivers, indicated by representative GNSS receivers 151 and 152, geographically spread over the coverage area of the wireless communication network 110, and a central cache. Although only two fixed GNSS receivers 151 and 152 are depicted, e.g., positioned at locations different from the locations of base stations 111-114, it is understood that in various embodiments, there may be different numbers of fixed GNSS receivers, which may be collocated with base stations 111-114 of the wireless communication network 110. The WARN 150 collects navigation messages from the fixed GNSS receivers 151 and 152 broadcast by the satellites 141-144. The navigation messages are collated and provided to the MLC 120 for caching. The MLC 120 may then use the cached navigation messages to provide assistance data to the mobile device 130 over the wireless communication network 110, as discussed below.

Figure 2:
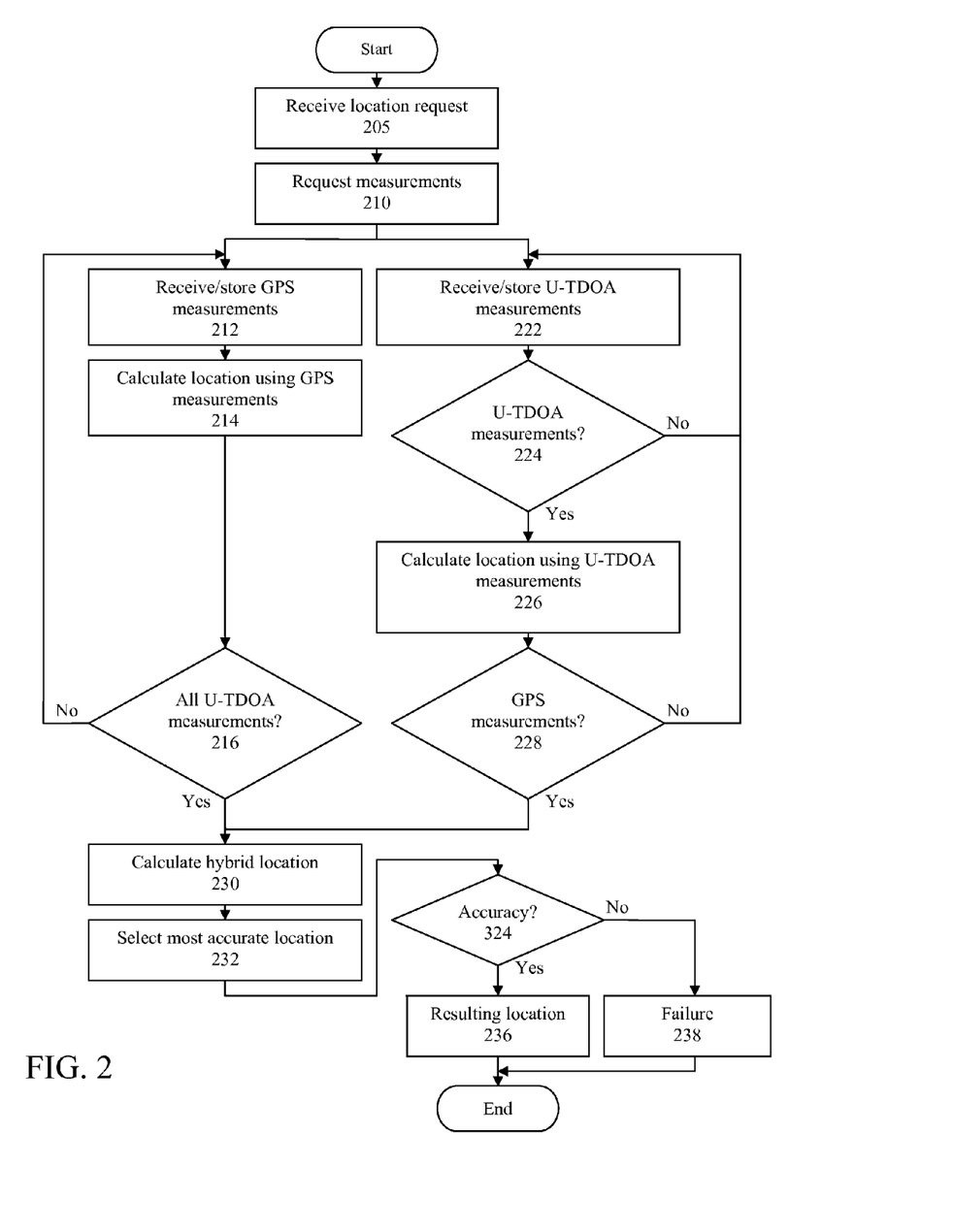
FIG. 2 is a flowchart illustrating a method for locating a mobile device in a wireless communication network, according to a representative embodiment.

FIG. 2 is a flow diagram illustrating a method for locating a mobile device in a wireless communication network, using the most accurate location determination, according to a representative embodiment.

Referring to FIG. 2, the MLC 120 receives a request at step 205 from the mobile device 130 over the wireless communication network 110 to determine the geographic location of the mobile device 130. The request may be in the form of a "911" call, for example, dialed at the mobile device 130, which automatically initiates the location determination process at the MLC via messaging that is received from the network node that detects the emergency call 120. In addition to the "911" emergency service, the mobile device 130 may include applications specifically directed to determining current geographic location, such as subscriber location services, mapping services, and the like.

In an embodiment, the location request includes a time within which the location of the mobile device 130 is to be determined and/or a designated accuracy of the location determination, such as a quality of position (QoP) parameter, which identifies the required accuracy within a specified range (e.g., indicated in meters). For example, the QoP parameter may indicate requisite horizontal accuracy, vertical accuracy and/or age of location with respect to the mobile device 130. When no time limit or QoP parameter is provided in the location request, the MLC 120 may provide respective default values.

At step 210, the MLC 120 concurrently requests location measurements from devices in the wireless communication network 110 and the mobile device 130. It is understood that concurrently, as used throughout this description, is intended to mean at the same time, close to the same time or over the same time period, such that the MLC 120 is able to calculate in parallel the location of the mobile device 130 using different measurement systems, such as a terrestrial positioning system and a GNSS positioning system. In other words, the MLC 120 does not wait to request measurements and/or to begin processing measurements from one positioning system until processing and/or location calculation is complete from another positioning system.

For purposes of explanation, it is assumed that the terrestrial positioning system included in the wireless communication network 110 is a U-TDOA system, and that the corresponding measurements are time-difference measurements provided by the LMUs 116-119 based on transit time measurements of signals exchanged with the mobile device 130. However, it is understood that other types of terrestrial positioning systems and corresponding measurements may be incorporated without departing from the scope of the disclosure. Likewise, for purposes of explanation, it is further assumed that the satellite positioning system of the GNSS network 140 is a GPS system, and that the corresponding measurements are distance and/or signal transit time measurements between the mobile device 130 and each of the GPS satellites (e.g., satellites 141-144) provided by the mobile device 130. However, it is understood that other types of satellite positioning systems and corresponding measurements may be incorporated without departing from the scope of the disclosure.

Accordingly, in the representative embodiment, the MLC 120 requests the U-TDOA measurements from the LMUs 116-119 and the GPS measurements from the mobile device 130. The MLC 120 awaits return of the measurements to begin processing. Notably, the GPS measurements are delivered together as a set to the MLC 120 by the mobile device 130, while the U-TDOA measurements do not necessarily arrive at the MLC 120 from the LMUs 116-119 at the same time. Therefore, even though the MLC 120 may request the GPS and U-TDOA measurements at the same time, the full set of GPS measurements typically arrives before the full set of U-TDOA measurements, which may be spread over a short period of time. However, depending on the circumstances, the MLC 120 may receive the full set of U-TDOA measurements first, for example, when geographical conditions make acquisition of GPS signals difficult, such as in low signal environments like urban canyons or indoors.

In an embodiment, the MLC 120 also provides satellite assistance data to the mobile device 130 over the wireless communication network 110 to aid the mobile device 130 in more quickly locating and acquiring the satellites 141-144. For example, the mobile device 130 may be an Assisted-GPS (A-GPS) capable handset, and the MLC 120 is thus able to provide A-GPS data to the mobile device 130, along with the request to begin providing GPS measurements. The A-GPS data may include, for example, satellite acquisition assistance in order to inform the mobile device 130 for which satellites to search and where in the time and frequency domain to search. The A-GPS data may also include other assistance data types, such as orbital modeling information of the GPS satellites (e.g., satellites 141-144), including satellite ephemeris data from the GPS satellites and/or previously stored almanac data, for example.

The A-GPS data enables the mobile device 130 to locate and "lock-on" to each of the GPS satellites quickly and efficiently. The GPS assistance data may be calculated, in part, using cached navigation messages (including ephemeris data and timing signals) provided by the WARN 150, as discussed above. In an embodiment, when GPS assistance data is required, the request from the mobile device 130 includes a number or other identifier of the cell in which it is located (e.g., cell 115). The MLC 120 may then access a database (not shown) to determine the latitude, longitude, orientation, opening and/or range of the cell 115, which may be used as an initial location for calculating the GPS assistance data. For example, the MLC 120 may calculate the GPS assistance data using the latitude and longitude of the serving base station 112 and its coverage area as the approximate initial location of the mobile device 130.

In an embodiment, the GPS assistance data improves the time-to-first-fix (TTFF) and yield. For example, the orbital modeling information of the GPS assistance data enables the mobile device 130 to avoid demodulating navigation messages broadcast from the GPS satellites, thus improving TTFF. Also, the search space for locating each of the GPS satellites is narrowed by the GPS acquisition assistance, so that the mobile device 130 can detect weaker GPS signals, thus improving yield.

At steps 212 and 222, the MLC 120 receives and stores GPS measurements from the mobile device 130, and begins receiving and storing U-TDOA measurements from the LMUs 116-119 at about the same time. Further, the MLC 120 begins attempting to calculate the location of the mobile device 130, e.g., at steps 214 and 224, based on the received GPS and U-TDOA measurements, as the measurements arrive from respective sources. Of course, as discussed above, the MLC 120 may receive the GPS and U-TDOA measurements over different or overlapping time periods after making the requests for measurements.

With respect to the received GPS measurements, the MLC 120 calculates a location of the mobile device 130 based on the received GPS measurements at step 214. More particularly, the mobile device 130 locks onto the satellites 141-144 (e.g., using the GPS assistance data provided by the MLC 120) and receives ranging signals from each of the satellites 141-144. The mobile device 130 determines a full set of GPS measurements by locking onto the satellites 141-144, and provides the full set of GPS measurements to the MLC 120 over the wireless communication network 110 via the base station 112. Ranging signals from at least four GPS satellites (e.g., satellites 141-144) are used to determine the location and clock bias of the mobile device 130 relative to a fixed coordinate system. Optionally, the mobile device 130 calculates its own location based on the GPS measurements and provides the location to the MLC 120. However, as stated above, the MLC 120 typically has more processing power than the mobile device 130, and the mobile device 130 saves battery power by allowing the MLC 120 to calculate the location remotely. In addition, the MLC 120 can perform a hybrid location using measurements that the mobile device 130 may not have access to, discussed below.

The MLC 120 stores the calculated GPS location, along with an uncertainty associated with the calculated GPS location. The uncertainty is an indication of the accuracy of the calculated GPS location, and may be affected by various factors such as the number of GPS satellites that the mobile device 130 measures, the geometry or the arrangement of the satellites, the signal strengths of the positioning signals received from the GPS satellites, and the like.

At step 216, the MLC 120 determines whether a full set of U-TDOA measurements has been received, e.g., from the LMUs 116-119, at step 224. For example, a full set of U-TDOA measurements may require U-TDOA measurements from at least four LMUs (e.g., LMUs 116-119) before a corresponding U-TDOA based location can be calculated or the LS 125 may indicate to the MLC 120 that it has received all of the measurements that it can get. Alternatively, the MLC 120 may determine whether a U-TDOA location has been calculated. When a full set of U-TDOA measurements has not yet been received (step 216: No), the process returns to step 212 or, in an alternative embodiment, enters a "wait" state to wait for an indication that the full set of U-TDOA measurements has arrived or a predetermined time limit has expired. When the MLC 120 collects another set of GPS measurements, repeating steps 212 through 216 until the full set of U-TDOA measurements has been received (step 216: Yes), after which the process proceeds to step 230 to calculate a hybrid location, discussed below. By repeating steps 212 through 216, the MLC 120 is able to incorporate of the most recent set of GPS measurements while awaiting receipt the full set of U-TDOA measurements.

Meanwhile, at step 224, the MLC 120 determines whether the full set of U-TDOA measurements has been received, e.g., from the LMUs 116-119 (as the GPS measurements are being received and processed). When the full set of U-TDOA measurements has been received (step 224: Yes), the MLC 120 calculates a location of the mobile device 130 based entirely on the received U-TDOA measurements at step 226. For example, in steps 222 through 226, the MLC 120 sends a request to the LS 125, which retrieves the U-TDOA measurements for the mobile device 130 from each of the LMUs 116-119 and provides the U-TDOA measurements to the MLC 120. Because the LMUs 116-119 are at known locations, the MLC 120 is able to calculate the location of the mobile device 130 using the time-differences provided by at least four LMUs (e.g., LMUs 116-119) for respective signals exchanged with the mobile device 130.

The MLC 120 stores the calculated U-TDOA location, along with an uncertainty associated with the calculated U-TDOA location. The uncertainty is an indication of the accuracy of the U-TDOA location, and may be affected by various factors such as the number of LMUs, the geometry or the arrangement of the LMUs, the signal strengths of the positioning signals received by the LMUs, and the like.

At step 228, the MLC 120 determines whether the set of GPS measurements has been received, e.g., from the mobile device 130. Alternatively, the MLC 120 may determine whether a GPS location has been calculated. When the set of GPS measurements has not yet been received (step 228: No), the process returns to step 222 and the MLC 120 continues to collect and process U-TDOA measurements. Steps 222 through 228 are repeated until the set of GPS measurements has been received (step 228: Yes). In an alternative embodiment, the MLC 120 enters a "wait" state to wait for an indication that the full set of GPS measurements has arrived or a predetermined time limit has expired. The process then proceeds to step 230 to calculate a hybrid location, discussed below.

At step 230, a hybrid location calculation is performed by the MLC 120 using the full sets of GPS measurements and U-TDOA measurements. In an embodiment, the hybrid location calculation includes combining the GPS measurements and the U-TDOA measurements in a weighted least squares process, for example, to perform the position calculation. The MLC 120 also calculates the uncertainty associated with the calculated hybrid location.

At step 232, the uncertainties associated with the calculated GPS location, U-TDOA location and hybrid location are compared with one another, and the calculated location having the smallest uncertainty at a given confidence is selected. However, before identifying the selected location as the geographic location of the mobile device 130, the MLC 120 first determines whether the selected location is sufficiently accurate at step 234. For example, the uncertainty associated with the selected location may be compared to a previously established threshold uncertainty, such as a QoP parameter. In various embodiments, the threshold uncertainty may be provided in the initial location request sent by the mobile device 130 at step 205, entered by a user or network operator, provided by a default setting, or the like.

When the selected location is determined to be accurate (step 234: Yes), the selected location is identified as the geographic location of the mobile device 130 at step 236, and the process ends. In an embodiment, the geographic location may be provided to the calling application of the mobile device 130 via the wireless communication network 110. Of course, the geographic location may also be provided to entities tasked with responding to the initial location request, such as police, firefighters, tow trucks, ambulance services or the like, in accordance with the particular service.

When the selected location is determined to be inaccurate (step 234: No), the attempted location determination fails at step 238, and the process ends. In an embodiment, the process may be repeated to collect additional GPS and U-TDOA measurements and/or the accuracy determination may be made using a lower uncertainty threshold.

In an alternative embodiment, each of the calculated GPS, U-TDOA and hybrid locations are compared to the required accuracy threshold at the time each respective calculation is completed. Then, the comparison at step 232 is performed only among the location calculations that have already met the required accuracy.

According to the embodiment depicted in FIG. 2, the GPS, U-TDOA and hybrid locations of the mobile device 130 are calculated more quickly than in conventional methods, e.g., since the receipt of measurements and subsequent location calculations for the GPS and U-TDOA measurements are performed in parallel, to the extent measurements are available, and the hybrid location calculation is performed upon completion of the GPS and U-TDOA location calculations. Also, selecting the location of the mobile device 130 from among three location determination methods assures the highest accuracy in a timely manner.

Figure 3:
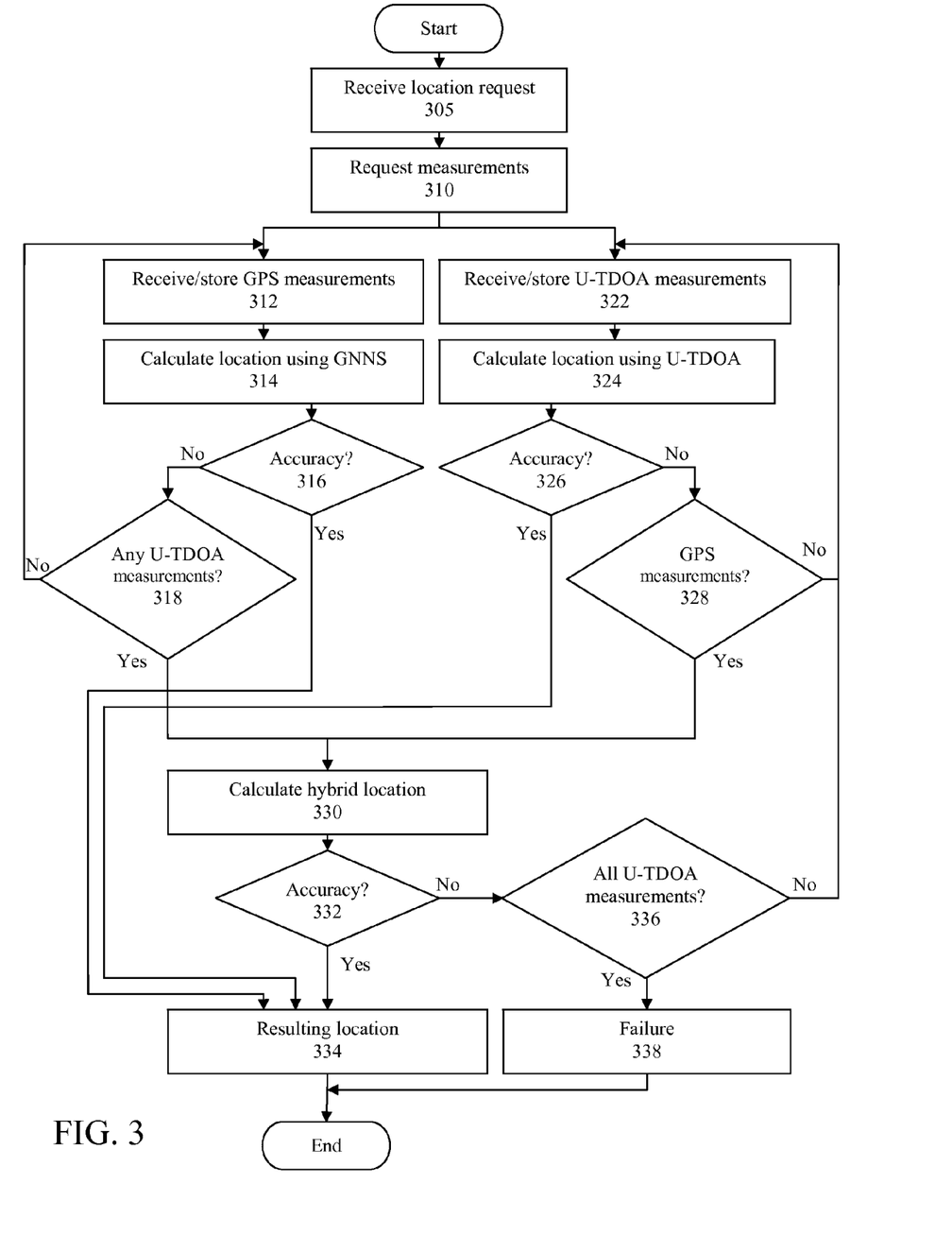
FIG. 3 is a flowchart illustrating a method for locating a mobile device in a wireless communication network, according to a representative embodiment.

FIG. 3 is a flow diagram illustrating a method for locating a mobile device in a wireless communication network, using the fastest location determination, according to a representative embodiment.

Referring to FIG. 3, the MLC 120 receives a request at step 305 from the mobile device 130 over the wireless communication network 110 to determine the geographic location of the mobile device 130. In an embodiment, the request includes a time within which the location of the mobile device 130 is to be determined and/or a designated accuracy of the location determination, such as a QoP parameter, which identifies the required accuracy within a specified range (e.g., indicated in meters). When no time limit or QoP parameter is provided in the request, the MLC 120 may provide respective default values.

At step 310, the MLC 120 requests location measurements from devices in the wireless communication network 110 and the mobile device 130 that will enable the MLC 120 to calculate the location of the mobile device 130. As in FIG. 2, for purposes of explanation, it is assumed that the terrestrial positioning system included in the wireless communication network 110 is a U-TDOA system, and that the corresponding measurements are time-difference measurements provided by the LMUs 116-119 based on transit time measurements of signals transmitted by the mobile device 130 and measured at each of the LMUs 116-119. However, it is understood that other types of terrestrial positioning systems and corresponding measurements may be incorporated without departing from the scope of the disclosure. Likewise, for purposes of explanation, it is further assumed that the satellite positioning system of the GNSS network 140 is a GPS system, and that the corresponding measurements are distance and/or signal transit time measurements between the mobile device 130 and each of the GPS satellites (e.g., satellites 141-144) provided by the mobile device 130. However, it is understood that other types of satellite positioning systems and corresponding measurements may be incorporated without departing from the scope of the disclosure.

Accordingly, in the representative embodiment, the MLC 120 requests the GPS measurements from the mobile device 130 and the U-TDOA measurements from the LMUs 116-119. The MLC 120 awaits return of the measurements to begin processing, as discussed above. In an embodiment, the MLC 120 also provides A-GPS assistance data to the mobile device 130 over the wireless communication network 110 to aid the mobile device 130 in more quickly locating and acquiring the satellites 141-144, as discussed above.

At steps 312 and 322, the MLC 120 receives and stores a full set of GPS measurements from the mobile device 130, and begins receiving and storing U-TDOA measurements from the LMUs 116-119 at about the same time. Further, the MLC 120 begins attempting to calculate the location of the mobile device 130, e.g., at steps 314 and 324, based on the incoming GPS and U-TDOA measurements, as the measurements arrive from respective sources. Of course, as discussed above, the MLC 120 may receive the GPS and U-TDOA measurements over different or overlapping time periods after making the requests for measurements.

With respect to the received GPS measurements, the MLC 120 calculates a location of the mobile device 130 based entirely on the received set of GPS measurements at step 314. More particularly, the mobile device 130 locks onto the satellites 141-144 (e.g., using the GPS assistance data provided by the MLC 120) and receives ranging signals from each of the satellites 141-144. The mobile device 130 provides the set of GPS measurements, based on the ranging signals that it has locked on to or measured, to the MLC 120 over the wireless communication network 110 via base station 112. Ranging signals from at least four GPS satellites (e.g., satellites 141-144) are used to calculate the location and the time offset of the clock of the mobile device 130 relative to a fixed coordinate. Optionally, the mobile device 130 calculates its own location based on the set of GPS measurements and provides the location to the MLC 120.

The MLC 120 also determines an uncertainty at a given confidence level associated with the calculated GPS location, which is an indication of the accuracy of the calculated GPS location, as discussed above. At step 316, the MLC 120 determines whether the calculated GPS location is sufficiently accurate, for example, by comparing the uncertainty to a previously established threshold uncertainty, such as a QoP parameter. In various embodiments, the threshold uncertainty may be provided in the initial location request sent by the mobile device 130 at step 305, entered by a user or network operator, provided by a default setting, or the like. When the calculated GPS location is determined to be accurate (step 316: Yes), the calculated GPS location is identified as the geographic location of the mobile device 130 at step 334. In other words, any on-going U-TDOA measurements and corresponding calculations are ended regardless of whether a full set of U-TDOA measurements has been received or of the state of U-TDOA location calculations. Likewise, no hybrid location calculations need be performed.

When the calculated GPS location is determined to be inaccurate (step 316: No), the process continues. In particular, the MLC 120 determines at step 318 whether any U-TDOA measurements have been received, e.g., from the LMUs 116-119. When no U-TDOA measurements have been received (step 318: No), the process returns to step 312 and the MLC 120 collects another set of GPS measurements or, in an alternative embodiment, enters a "wait" state to wait for an indication that at least one U-TDOA measurement has arrived or a predetermined time limit has expired. When the MLC 120 collects another set of GPS measurements, steps 312 through 318 are repeated until a sufficiently accurate GPS location is calculated (step 316: Yes) or at least one U-TDOA measurement has been received (step 318: Yes). When at least one U-TDOA measurement has been received (step 318: Yes), the process proceeds to step 330 to calculate a hybrid location, based on the GPS measurements and the at least one U-TDOA measurement, unless the received U-TDOA measurements have since rendered a sufficiently accurate location of the mobile device 130 (determined at step 326), as discussed below.

Meanwhile, at step 324, the MLC 120 begins calculating a location of the mobile device 130 based entirely on the received U-TDOA measurements (even if a full set of U-TDOA has yet not been received). For example, the MLC 120 sends a request to the LS 125, which retrieves the U-TDOA measurements for the mobile device 130 from each of the LMUs 116-119 and provides the U-TDOA measurements to the MLC 120.

The MLC 120 also determines an uncertainty at a given confidence level associated with the calculated U-TDOA location, which is an indication of the accuracy of the U-TDOA location, as discussed above. At step 326, the MLC 120 determines whether the calculated U-TDOA location is sufficiently accurate, for example, by comparing the uncertainty to the previously established threshold uncertainty. When the U-TDOA location is determined to be accurate (step 326: Yes), the U-TDOA location is identified as the geographic location of the mobile device 130 at step 334. In other words, any on-going GPS measurements and corresponding calculations are ended regardless of whether a full set of GPS measurements has been received or of the state of GPS location calculations. Likewise, no hybrid location calculations need be performed.

When the U-TDOA location is determined to be inaccurate (step 326: No), the process continues. In particular, the MLC 120 determines at step 328 whether a full set of GPS measurements has been received, e.g., from the mobile device 130, as discussed above. When the set of GPS measurements has not been received (step 328: No), the process returns to step 322 and the MLC 120 continues to collect U-TDOA measurements or, in an alternative embodiment, enters a "wait" state to wait for an indication that the set of GPS measurements has arrived or a predetermined time limit has expired. When the MLC 120 continues to collect U-TDOA measurements, steps 322 through 328 are repeated until a sufficiently accurate U-TDOA location is calculated (step 326: Yes) or the full set of GPS measurements has been received (step 328: Yes).

When full sets of GPS and U-TDOA measurements have been received (steps 318 and 328: Yes), and neither GPS nor U-TDOA calculated locations meet the uncertainty threshold (steps 316 and 326: No), the process proceeds to step 330 to calculate the hybrid location using the full sets of GPS and U-TDOA measurements, as discussed above with respect to step 230 of FIG. 2. The MLC 120 also calculates the uncertainty at the given confidence level associated with the calculated hybrid location.

At step 332, the MLC 120 determines whether the calculated hybrid location is sufficiently accurate, for example, by comparing the associated uncertainty to the previously established threshold uncertainty. When the hybrid location is determined to be accurate (step 332: Yes), the hybrid location is identified as the geographic location of the mobile device 130 at step 334 and the process ends. When the hybrid location is determined to be inaccurate (step 332: No), the process continues. In particular, the MLC 120 determines at step 336 whether a full set of U-TDOA measurements has been received, e.g., from the LMUs 116-119, as discussed above. When a full set of U-TDOA measurements has not been received (step 336: No), the process returns to step 322 and the MLC 120 continues to collect U-TDOA measurements until a full set of U-TDOA measurements has been received. When a full set of U-TDOA measurements has been received (step 336: Yes), the attempted location determination fails at step 338, and the process ends.

According to the embodiment depicted in FIG. 3, the geographic location of the mobile device 130 is calculated more quickly than in conventional methods, e.g., since multiple location determination processes are executed in parallel, and the first accurate location resulting from one of these processes is accepted as the geographic location of the mobile device 130, regardless of whether other location determination processes (e.g., using other sets of measurements) have been completed.

Figure 4:
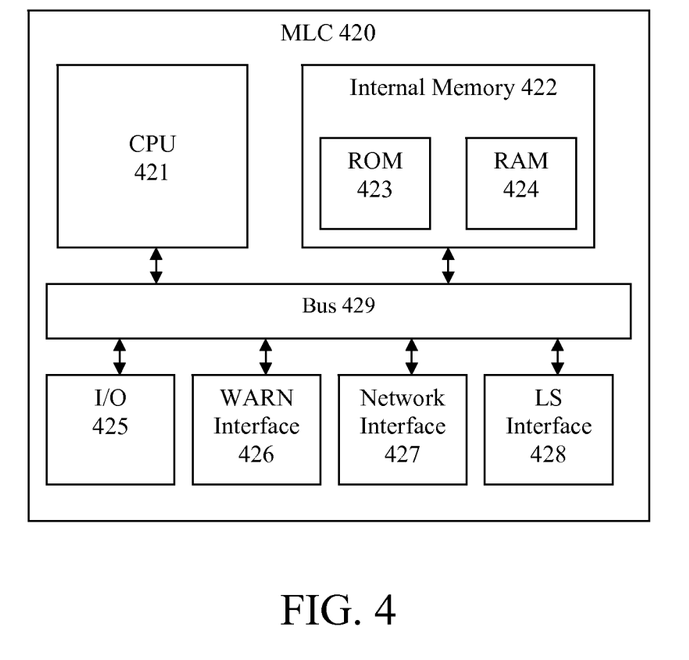
FIG. 4 is a functional block diagram illustrating a device for locating a mobile device in a wireless communication network, according to a representative embodiment.

FIG. 4 is a functional block diagram illustrating an MLC 420 for calculating locations of mobile devices in a wireless communication network, according to representative embodiments. Although the MLC 420 is shown and discussed in detail, it is understood that other servers in the system 100, such as the LS server 125 in the wireless communication network 110, may be configured in a similar manner as the MLC 420, at least with respect to processing and storage functionality.

In the depicted embodiment, the MLC 420 includes central processing unit (CPU) 421, internal memory 422, bus 429 and various interfaces 425-428. The CPU 421 is configured to execute one or more software algorithms, including the mobile device location determination process of the embodiments described herein. In various embodiments, the CPU 421 may include its own memory (e.g., nonvolatile memory) for storing executable software code that allows it to perform various functions, including the location determination process. Alternatively, the executable code may be stored in designated memory locations within internal memory 422. The CPU 421 may execute an operating system, such as a Windows® operating system available from Microsoft Corporation, a Linux operating system, a Unix operating system (e.g., Solaris™ available from Sun Microsystems, Inc.), or a NetWare® operating system available from Novell, Inc.

The internal memory 422 includes at least nonvolatile read only memory (ROM) 423 and volatile random access memory (RAM) 424, although it is understood that internal memory 422 may be implemented as any number, type and combination of ROM and RAM, and may provide look-up tables and/or other relational functionality. In various embodiments, the internal memory 422 may include a disk drive or flash memory, for example. Further, the internal memory 422 may store program instructions and results of calculations or summaries performed by CPU 421.

In an embodiment, a user and/or other computers may interact with the MLC 420 using various input device(s) through I/O interface 425. The input devices may include a keyboard, a track ball, a mouse, a touch pad or touch-sensitive display, and the like. Also, information may be displayed on a display through a display interface (not shown), which may include any type of graphical user interface (GUI). For example, as a result of the location determination process, the geographic location of the mobile device 130 or an indication of failure may be visually displayed.

Other interfaces include the WARN interface 426, the network interface 427 and the LS interface 428. The WARN interface 426 enables the MLC 420 to receive GPS information, such as navigation messages, from fixed GPS receivers 151 and 152, e.g., of the GNSS network 140. The network interface 427 enables data communications and control signaling between the MLC 420 and other network nodes, such as the base stations 111-114. The LS interface 428 enables the MLC 420 to communicate with the LS server 125 and to receive U-TDOA measurements collected by the LS server 125 from the LMUs 116-119, for example. The various interfaces may be a universal serial bus (USB) interface, an IEEE 1394 interface, or a parallel port interface, for example. As stated above, it will be understood that, although depicted separately, the MLC 420 may include the functionality of various entities with which it is depicted as interfacing, including the LS server 125 and the WARN 150, in various embodiments.

The various "parts" shown in the MLC 420 may be physically implemented using a software-controlled microprocessor, hard-wired logic circuits, or a combination thereof. Also, while the parts are functionally segregated in the MLC 420 for explanation purposes, they may be combined variously in any physical implementation.

Figure 5:
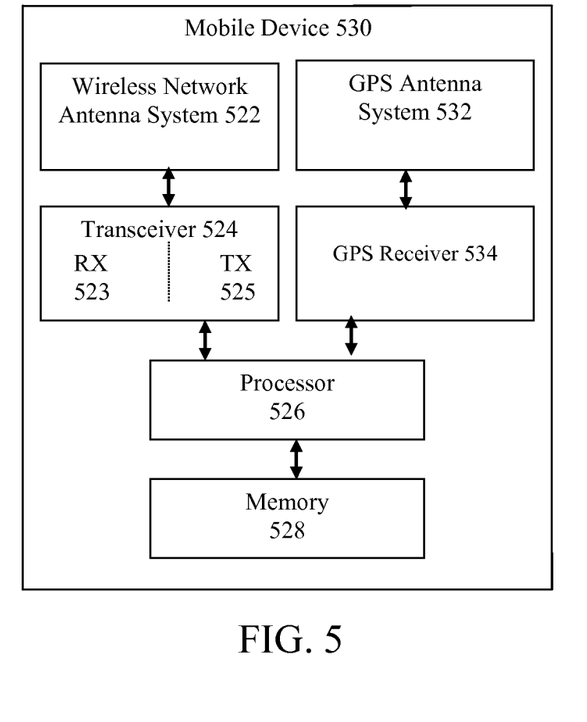
FIG. 5 is a functional block diagram illustrating a mobile device in a wireless communication network, according to a representative embodiment.

FIG. 5 is a functional block diagram of representative mobile device 530, configured to communicate with an MLC (e.g., MLC 120 of FIG. 1 or MLC 420 of FIG. 4), over a wireless communication network, according to various embodiments. The mobile device 530 includes transceiver 524, antenna system 522, GPS receiver 534, GPS antenna system 532, processor 526 and memory 528.

The transceiver 524 includes a receiver 523 and a transmitter 525, and provides functionality for the mobile device 530 to communicate with base stations in the wireless communication network (e.g., base stations 111-114), according to appropriate standard protocols, such UMTS, GSM, CDMA, WiFi, WiMax, and the like. The transceiver 524 sends and received voice/data and control signals through the antenna system 522, which may include an omni-directional antenna, a steerable antenna, an antenna array or other compatible antenna. The GPS receiver 534 receives positioning signals from GPS satellites (e.g., satellites 141-144), including navigation messages providing ephemeris data and timing signals. The GPS receiver 534 receives GPS positioning signals through the GPS antenna system 532, which may be a stub antenna, for example.

The processor 526 is configured to execute one or more software algorithms, including the location determination algorithm of the embodiments described herein, in conjunction with memory 528 to provide the functionality of mobile device 530. The processor 526 may include its own memory (e.g., nonvolatile memory) for storing executable software code that allows it to perform the various functions of the mobile device 530, discussed herein. Alternatively, the executable code may be stored in designated memory locations within memory 528. The processor 526 may also provide a clock for determining timing for the mobile device 530. In an embodiment, the processor 526 is configured to derive GPS measurements from received GPS ranging signals. The GPS measurements may then be forwarded to an MLC (e.g., MLC 120) through the transmitter 525 over a wireless communication network (e.g., wireless communication network 110). Also, in another embodiment, the processor 526 may calculate the location of the mobile device 530 using the GPS measurements, and forward the calculated GPS location to the MLC 120.

The various "parts" shown in the mobile device 530 may be physically implemented using a software-controlled microprocessor, hard-wired logic circuits, or a combination thereof. Also, while the parts are functionally segregated in the mobile device 530 for explanation purposes, they may be combined variously in any physical implementation.

While specific embodiments are disclosed herein, many variations are possible, which remain within the concept and scope of the invention. Such variations would become clear after inspection of the specification, drawings and claims herein. The invention therefore is not to be restricted except within the scope of the appended claims.

What is claimed is:

1. A method for a mobile location center (MLC) to determine a location of a mobile device in a wireless communication network, the method comprising:
   receiving a request initiated by the mobile device to determine the location of the mobile device;
   concurrently requesting global navigation satellite system (GNSS) measurements from the mobile device and terrestrial measurements from transceivers in the wireless communication network;
   receiving the GNSS measurements and at least one of the terrestrial measurements;
   calculating a GNSS location of the mobile device as a function of the received GNSS measurements, and determining that the location of the mobile device comprises the calculated GNSS location when the calculated GNSS location meets a predetermined accuracy threshold;
   calculating a terrestrial location of the mobile device as a function of the received terrestrial measurements, and determining that the location of the mobile device comprises the calculated terrestrial location when the calculated terrestrial location meets the predetermined accuracy threshold; and
   calculating a hybrid location of the mobile device as a function of the received GNSS measurements and the received terrestrial measurements when neither the calculated GNSS location nor the calculated terrestrial location meets the predetermined accuracy threshold, and determining that the location of the mobile device comprises the calculated hybrid location when the calculated hybrid location meets the predetermined accuracy threshold.

2. The method of claim 1, wherein the GNSS measurements and the at least one terrestrial measurement are received over substantially the same period of time.

3. The method of claim 1, wherein calculating the GNSS location of the mobile device as a function of the received GNSS measurements and calculating the terrestrial location of the mobile device as a function of the received terrestrial measurements are performed in parallel.

4. The method of claim 1, further comprising:
   determining whether the received terrestrial measurements include terrestrial measurements from all of the transceivers when the calculated hybrid location does not meet the predetermined accuracy threshold; and
   receiving remaining terrestrial measurements and calculating an additional terrestrial location of the mobile device as a function of the received terrestrial measurements and the received remaining terrestrial measurements when the received terrestrial measurements do not include the terrestrial measurements from all of the transceivers.

5. The method of claim 1, wherein the GNSS measurements comprise measurements from one of a global positioning system (GPS), a Global Navigation Satellite System (GLONASS), Galileo system or a COMPASS Navigation Satellite System (BeiDou).

6. The method of claim 5, wherein the terrestrial measurements comprise measurements from one of an uplink time difference of arrival (U-TDOA) system, an enhanced observed time difference (E-OTD) system, an angle of arrival (AoA) system or a power of arrival (POA) system.

7. The method of claim 1, wherein the received request includes the predetermined accuracy threshold.

8. The method of claim 7, wherein the predetermined accuracy threshold comprises a quality of position (QoP) parameter.

9. The method of claim 1, wherein the received request comprises a time limit in which the MLC is to complete determining the location of the mobile device.

10. The method of claim 1, wherein the received request comprises a 911 call placed by the mobile device.

11. The method of claim 5, further comprising:
calculating GPS assistance data in response to the received request when the GNSS measurements comprise measurements from a GPS system; and
sending the GPS assistance data to the mobile device to improve a time-to-first-fix and a yield for obtaining the GPS measurements.

12. The method of claim 11, wherein calculating the GPS assistance data comprises:
receiving and collating GPS data from a plurality of fixed GPS receivers; and
calculating the GPS assistance data based on the received GPS data and an estimated location of the mobile device.

13. A system for determining a location of a mobile device in a wireless communication network, the system comprising:
a mobile location center (MLC) configured to determine, in parallel, a first location of the mobile device and a corresponding first accuracy as a function of first measurements and a second location of the mobile device and a corresponding second accuracy as a function of second measurements, and to identify one of the first location and the second location as the geographic location of the mobile device when any one of the first or second accuracies exceeds a predetermined threshold, and to determine a hybrid location of the mobile device as a function of the first measurements and the second measurements when neither the first accuracy nor the second accuracy exceeds the predetermined accuracy threshold.

14. The system of claim 13, wherein the first measurements comprise global navigation satellite system (GNSS) measurements received at least in part from the mobile device, and the second measurements comprise terrestrial measurements received from a plurality of nodes in the wireless communication network.

15. The system of claim 14, further comprising:
an uplink time difference of arrival (U-TDOA) location service (ULS) server configured to receive the second measurements from the plurality of network nodes, the second measurements comprising U-TDOA measurements based on signals transmitted from each of the plurality of network nodes to the mobile device.

16. A method for a mobile location center (MLC) to determine a geographic location of a mobile device in a wireless communication network, the method comprising:
concurrently requesting global navigation system (GNSS) measurements from the mobile device and terrestrial measurements from a plurality of nodes in the wireless communication network;
concurrently calculating a first location of the mobile device as a function of the GNSS measurements and a second location of the mobile device as a function of the terrestrial measurements;
calculating a third location of the mobile device as a function of both the GNSS measurements and the terrestrial measurements; and
selecting one of the first, second or third locations having a highest accuracy as the geographic location of the mobile device.

17. The method of claim 16, wherein calculating the third location comprises:
determining when a complete set of GNSS measurements and a complete set of terrestrial measurements have been received; and
calculating the third location of the mobile device after the complete sets of GNSS and terrestrial measurements have been received.

18. The method of claim 17, wherein selecting the one of the first, second or third locations comprises:
determining an uncertainty value corresponding to each of the first, second and third locations; and
selecting one of the first, second or third locations having a smallest corresponding uncertainty value as the geographic location of the mobile device.

19. The method of claim 17, wherein the wireless communication network comprises one of a Universal Mobile Telecommunications System (UMTS) network and a Global System for Mobile communications (GSM) network.

* * * * *